United States Patent Office

3,215,647
Patented Nov. 2, 1965

3,215,647
SYNTHETIC RUBBER LATEX FOAM CONTAINING A COREACTIVE MATERIAL AND PROCESS OF MAKING SAME
Edwin R. Dunn, Midland, Mich., assignor to The Dow Chemical Company, Midland, Mich., a corporation of Delaware
No Drawing. Filed June 19, 1962, Ser. No. 203,448
23 Claims. (Cl. 260—2.5)

This invention relates to making improved synthetic latex solid foams. More particularly, it relates (1) to an improved method for the preparation of synthetic latex solid foams comprising an improved gelation technique and simplified compounding which increases the range of composition and of solids concentration of emulsion polymers which are usable to make foamed products, (2) to the solid foam produced by such a method and (3) to articles coated by a solid foam prepared by such a method.

It is known to prepare foam rubber from a polymer in the form of an aqueous emulsion. Such a process comprises forming a foam structure by chemical blowing agents or by whipping or otherwise aerating the latex which has been compounded with antioxidants, accelerators and vulcanizing agents in the usual manner, together with frothing aids, such as soap solutions; after forming such foam, a cogulating or destabilizing agent, having a delayed action, such as sodium silicofluoride, is added; by suitable adjustments of the amount of coagulating agent and the temperature of the mixing step, the foam remains sufficiently stable that it may be introduced into molds, or spread on a flat tray or belt, or coated onto fabrics, then gelled and subsequently vulcanized, often in steam at atmospheric pressure. The cellular article may then be removed, washed and dried. In a somewhat different process, in which the foaming step occurs after the material is placed in a mold, hydrogen peroxide is added to the compounded latex along with a peroxide decomposition catalyst; the liquid composiiton then is placed in molds where a delayed decomposition of the peroxide occurs thus liberating oxygen which expands the material into a cellular structure that fills the mold; subsequent freezing maintains the expanded structure while a gas such as carbon dioxide permeates the structure and coagulates the material into the permanent structure; vulcanization and subsequent steps are carried out as in the previously described method.

The polymers which may be used in these prior art processes are limited almost exclusively to natural rubber, to certain polymers of 2-chloro-1,3-butadiene and to the GRS cold rubbers because of requirements for high solids concentration and early development of strength in wet coagulated foam in the most widely used processes, and/or by the requirements for polymers which are film forming at low temperatures in the processes which use freezing for the initial setting of the foam. Other disadvantages arise from the compounding difficulties of incorporating the vulcanizing agents, and related materials, into the aqueous emulsion. A still further disadvantage arises from the discoloration and staining which occurs because of the presence of usual vulcanizing agents and related additives.

It is an object of this invention to provide new and advantageous means for making latex foam products. A more particular object is to provide a method for making latex foam products. A further object is to provide a process for making latex foam products which can be cured without the use of the usual sulfur-containing vulcanizing agents, or other vulcanizing agents acting in substantially the same manner, and without the usual accessory vulcanizing ingredients. A still further object is to provide latex foam products with improved initial color and non-staining features, and better resistance to color change and deterioration of other desirable properties with age. Other objects will be apparent from the following description.

These objects have been accomplished by the discovery, and this discovery is the subject of this invention, that when a latex comprising a polymer having certain reactive substituent groups is intimately mixed with an aqueous or water-miscible solution or an aqueous dispersion of a coreactive material containing one or more carbon atoms and additionally which has at least two of certain substituent groups coreactive with the reactive groups on the latex polymer, and then the mixture is foamed by mechanical or chemical means, placed into molds or spread onto a suitable support or substrate, the foam gels to a stable foam structure at a rate which is controlled by adjustment of the composition and concentration of the reactants and of the temperature and pH of the system; the solid foam is then cured without the addition of the usual vulcanizing agents and accessory compounds; and the resulting products have good initial color, are non-staining and have improved resistance to change in the desirable properties with age.

To prepare the latexes applicable to the practice of this invention at least two polymerizable, ethylenically unsaturated monomers, of the class of styrene and monomers copolymerizable with styrene, are copolymerized in an emulsion system to form a latex copolymer which is film forming below 250° F. or can be made film forming at that temperature by the addition of solvents or plasticizers.

At least one of such monomers which is copolymerized to form a latex for use in the instant invention consists of those polymerizable, ethylenically unsaturated monomers which have pendant reactive substituent groups such as carboxy, sulfo, primary amino, secondary amino, carboxamido, methylolcarboxamido, sulfonamido, primary hydroxyl, secondary hydroxyl, phenolic hydroxyl, aldehydic, and epoxy groups or which have substituent groups which, subsequent to polymerization, can be converted to such reactive substituent groups, e.g., ester, nitrile, amide, or salt groups which can be hydrolyzed to reactive acid, amine, or hydroxyl groups. Examples of such ethylenically unsaturated monomers having pendant reactive substituent groups are acrylic acid, methacrylic acid, itaconic acid, fumaric acid, maleic acid, ethyl acid maleate, 2-sulfoethyl acrylate, 2-sulfoethyl methacrylate, 2-aminoethyl methacrylate hydrochloride, 2-aminoethyl acrylate hydrochloride, vinyl benzylamine, glycidyl methacrylate, hydroxystyrene, acrolein, methacrolein, allyl alcohol, vinylbenzyl alcohol, 2-hydroxyethyl acrylate, 2-hydroxyethyl methacrylate, acrylamide, bis-N-methylol acrylamide, N-methylolacrylamide, N-methylolmethacrylamide, bis-N-methylolmethacrylamide, methacrylamide, N-$\beta$-hydroxyethyl acrylamide, N-$\beta$-hydroxyethyl methacrylamide, $\beta$-hydroxypropyl acrylate, $\beta$-hydroxypropylmethacrylate, $\gamma$-hydroxypropyl acrylate, $\gamma$-hydroxypropyl methacrylate, 6-hydroxyhexyl acrylate, 6-hydroxyhexyl methacrylate, sodium styrene sulfonate, sodium $\alpha$-methylstyrene sulfonate, 2-methylaminoethyl acrylate hydrochloride, 2-methylaminoethyl methacrylate hydrochloride, 3-methylaminopropyl acrylate hydrochloride, 3-methylaminopropyl methacrylate hydrochloride, 3-methylaminobutyl acrylate hydrochloride, 3-methylaminobutyl methacrylate hydrochloride, 3-ethylaminopropyl acrylate hydrochloride, and styrene sulfonamide.

Among the ethylenically unsaturated monomers of the class of styrene and monomers copolymerizable with styrene are the monomers having reactive substituent groups described supra, the alkenyl-aromatic compounds (the styrene compounds), the derivatives of ethylenically unsaturated acids such as the acrylic esters, acrylic nitriles, maleic esters, fumarate esters, unsaturated alcohol esters, unsaturated ketones, the conjugated olefins and other compounds containing one or more ethylenic linkages capable of addition polymerization.

Specific examples of such ethylenically unsaturated compounds are styrene, α-methylstyrene, ar-methylstyrene, ar-ethylstyrene, α-ar-dimethylstyrene, ar,ar-dimethylstyrene, ar-t-butyl styrene, vinylnaphthalene, methoxystyrene, cyanostyrene, acetylstyrene, monochlorostyrene, dichlorostyrene and other halostyrenes, methyl methacrylate, ethyl acrylate, butyl acrylate, hexyl acrylate, 2-ethylhexyl acrylate, lauryl methacrylate, phenyl acrylate, acrylonitrile, methacrylonitrile, ethyl α-chloroacrylate, diethyl maleate, polyglycol maleate, vinyl chloride, vinyl bromide, vinylidene chloride, vinylidene bromide, vinyl methyl ketone, methyl isopropenyl ketone, vinyl ethyl ester, 1,3-butadiene, isoprene and the like.

The ethylenically unsaturated monomers having pendant reactive substituent groups are used in quantities from about 0.5 to about 20 percent by weight of the total monomer constituents. Thus from about 99.5 to about 80 percent by weight of the monomers consist of the ethylenically unsaturated monomers, also of the class of styrene and monomers copolymerizable with styrene, and which do not have pendant reactive substituent groups. However, in view of the wide range of products as to composition and properties which are made possible by this invention, and the correspondingly wide range of end uses, the optimum amount of the monomers, having pendant reactive substituents, which are copolymerized in the latex will vary somewhat according to the properties desired for the particular end use. The lower amounts, in general, will be used where the pendant reactive substituent groups of the latex polymer are in relatively greater concentration on the surface of the particles rather than homogeneously scattered throughout the particles and where a minimum amount of cross-linking is desired. As the proportion of the monomers having pendant reactive substituent groups is increased in such a latex the wet strength of the gelled foam is increased and, while the tear strength, compression modulus, and hardness of the cured foam increase, the elongation and tackiness decrease.

Such monomers are copolymerized in aqueous emulsion containing surface active agents, catalysts, modifiers, etc., and under conditions of time, temperature, pressure, agitation, etc., in accordance with well known principles of emulsion polymerization. However, because of the effects provided by the reactive-substituent monomers, the kinds of constituents employed in the aqueous phase of the emulsion polymerization are selected to be compatible with such monomers. For example, if the pendant reactive substituent is anionic, then only anionic or nonionic emulsifiers are used in the polymerization. If the pendant reactive substituent is cationic, then only cationic or non-ionic emulsifiers are used. Moreover, since some of the pendant reactive substituents confer surface active properties to the monomer and to the resulting copolymer in the latex, the amount of conventional surface active agent can often be markedly reduced or even eliminated in the emulsion polymerization step.

The essence of this invention is not in the preparation of the latexes per se but rather in a process for making latex foam products by the use of reactive latexes in conjunction with certain coreactive materials as hereinafter defined and to the products derived from such a process. The latexes may be prepared by copolymerization of monomers selected as hereinbefore described or there may be substituted for such latexes water dispersions of preformed polymers which have been modified, e.g., by grafting or by other means, to have pendant carboxy, sulfo, primary amino, secondary amino, carboxamido, methylolcarboxamido, sulfonamido, primary hydroxyl, secondary hydroxyl, phenolic hydroxyl, aldehydic, or epoxy groups. Similarly, polymers which are hydrolyzable to give water dispersions of polymers having such reactive groups find usefulness in the practice of this invention. The term "reactive latexes" wherever used in this specification includes all of the water dispersions of polymers hereinbefore described.

The coreactive materials which are mixed with the reactive latexes prescribed for this invention are those materials which are soluble in water or in water-miscible solvents or which are water-dispersible and which contain at least one carbon atom and which have at least two substituent groups coreactive with the reactive groups on the copolymer of said latex. There may be selected as the coreactive material for use with the reactive latex component other latexes which contain polymers having a plurality of substituent groups which also are coreactive with the substituent groups on the copolymer of the said reactive latex. Representative coreactive substituent groups are (a) methylol groups when attached to a nitrogen atom, (b) modified methylol groups which have been alkylated with an alcohol having from 1 to 4 carbon atoms when such groups are attached to a nitrogen atom, (c) methylol groups when attached to the aromatic ring of a phenolic compound, (d) carboxyl groups, (e) primary amino groups, (f) secondary amino groups and (g) epoxy groups. The nitrogen atom in (a) and (b) may be a part of the main chain or ring of the compound or polymer.

Examples of such coreactive materials are melamine, melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates, phenol-formaldehyde condensates, ammonia-formaldehyde-hydrochloric acid condensates, liquid epoxy resins, ethylene diamine-formaldehyde condensates, hexamethylene diamine-formaldehyde condensates, polyethyleneimine, ethylene diamine, diethylene triamine, triethylene tetramine acetate, trimethylene diamine, tetramethylene diamine, hexamethylene diamine, decamethylene diamine, tetraethylene pentamine, guanidine, formoguanamine, benzoguanamine, dicyandiamide, malonic acid, succinic acid, glutaric acid, adipic acid, pimelic acid, suberic acid, azaleic acid, sebacic acid, polyacrylic acid, a latex comprising a copolymer of styrene, 1,3-butadiene and 2-aminoethyl methacrylate hydrochloride, and a latex comprising vinyl chloride, vinylidene chloride and 2-sulfoethyl methacrylate.

The term "coreactive material" wherever used in this specification designates compositions according to the foregoing description.

The reactive latex and the coreactive material are used in such amounts that the mixture contains the coreactive material in a quantity equal to from about 1 to about 100 percent of the weight of the copolymer comprising the latex. If the coreactive material is water-soluble, it may simply be mixed with the latex or the material may be added as an aqueous solution or as a solution in a water-miscible solvent. If the coreactive material is not appreciably soluble in water or a water-miscible solvent, then it is added as an aqueous emulsion. However, the emulsifiers used for the preparation of such emulsions, as well as the emulsifiers used in the manufacture of the latex, preferably are selected so that they are compatible with one another and with the reactive groups on the latex polymer and with the reactive groups on the coreactive material.

The term "in water dilutable condition" when applied to the coreactive materials of this invention includes water soluble coreactive materials, aqueous solutions of such materials, solutions of such materials in water miscible solvents, and aqueous emulsions of the coreactive materials which are not appreciably water-soluble.

Thickening agents such as methyl cellulose may be added if desired.

An adjustment of the pH of the mixture of the reactive latex and the coreactive material may be made, if desired, by the addition of usual acidifying or alkalizing agents such as acetic acid, citric acid, dilute mineral acids, ammonium hydroxide, dilute aqueous solutions of alkali metal hydroxides, and the like. If the mixture is not at the desired pH level, the pH usually is adjusted to a value between 3 and about 13.

Such a mixture of the reactive latex and the coreactive material may be foamed or frothed by the blowing agents and the methods of their use which are applicable to the known art for the previously known kinds of latex foam; for example, releasing a non-coagulating gas such as nitrogen, or by causing the decomposition of a gas-liberating material to chemically react with an ingredient in the mixture with the liberation of a non-coagulable gas as a reaction product. The mixture of the reactive latex and the coreactive material is also foamed by whipping or by use of apparatus having commercially available foam heads. Known foaming aids, such as sodium lauryl sulfate, or foam stabilizers, such as potassium oleate, may be added if desired. Preferably, such added materials should be non-reactive with the reactive group in the latex polymer or in the coreactive material and thus the preference may vary with the composition of the mixture. Other soaps, emulsifiers, wetting agents, surfactants, and the like, however, may be used even though they may be reactive to a limited extent. The volume of the mixture usually is increased from 5 to 12 times its original volume during the frothing step.

Although not required in the practice of this invention, known coagulating or destabilizing agents such as sodium silico-fluoride and zinc oxide or ammonium acetate, alkali fluotitanates, alkali fluozirconates and also known catalysts may be used as auxiliary aids in the gelation step if desired. If such auxiliary aids are used, they are usually added when the froth has reached the desired volume. The frothed mixture is poured into molds, spread on a flat tray or belt, or coated onto substrates. For the purpose of these specifications, the term "substrate" is defined as any material such as cloth, fabric, leather, wood, glass, or metal or any form of backing to which the frothed mixture will adhere when applied and after it is cured. The gelation step is carried out at a gelation temperature between room temperature and just below the boiling point of water. While an increase in temperature speeds the action, temperatures above the boiling point of water interfere with the formation of the desired multicellular structure. Therefore, temperatures between 150° and 210° F. often are preferred, particularly if no auxiliary gelling aids are used.

The prior art which required the use of gelling agents also required acid coagulable latexes and functioned by the inactivation of the emulsion stabilizer in the latexes thus causing coagulation. While it is not intended to be bound by any particular theory of operation of this invention, it is thought that in the practice thereof gelation occurs through particle-to-particle cross-linking reactions through the interaction of the reactive latex polymer and the coreactive material, as herein defined. The gelation step in this invention does not depend entirely on deactivation of soaps present in the latex.

The curing step of this invention is an extension of the gelling procedure and proceeds by the further interaction of the reactive latex polymer and the coreactive material. The curing step in the previously known procedures for making latex foam required the use of added vulcanizing agents, together with the requisite supplementary agents, including catalysts or accelerators. In the process and products of this invention, such customary vulcanizing additives are not required, although they may be used as auixiliary agents if desired. Operable ranges of temperature of the curing step are from about 32° F. or just above the film-forming temperature of the composition, whichever is higher, to just below the melting point or decomposition temperature of the composition, whichever is lower. However, temperatures below room temperature seldom, if ever, are used. Since higher temperatures accelerate the rate of cure as well as the rate of removal of water, the curing step often is carried out at from about 200° F. to about 400° F. for from about 5 to about 90 minutes.

From the foregoing it will be evident that both the latex foam gelling and curing steps proceed by mechanisms which are fundamentally different from those of the prior art methods of making latex foam products and enable the use of latex starting materials and provide foam products which cannot be used or provided by prior art methods.

Having been provided with the method and compositions of this invention and the guidance disclosed thereby, those skilled in the art will be able to select proportions and combinations within the scope contemplated by the invention to give products with the properties desired for a particular application.

The following examples illustrate how the invention may be practiced but are not to be construed as limiting its scope. In the examples parts and percentages are by weight unless otherwise specified.

*Example 1*

A latex was obtained by first preparing a solution of 122 parts of water, 0.10 part of the sodium salt of dodecyldiphenyl oxide disulfonic acid, 0.5 part of potassium persulfate and 0.020 part of the trisodium salt of N-hydroxyethylethylenediaminetriacetic acid; then 30 of styrene, 60 parts of 1,3-butadiene, and 10 parts of acrylic acid were added in that order; and the mixture was agitated for 16 hours at 70° C. The resulting latex product was post-stabilized with 3 parts of a nonyl phenol-ethylene oxide condensate having 9–10 moles of ethylene oxide per mole of nonyl phenol and a cloud point of 52–56° C., and then the pH of the latex was adjusted to 7.5 with concentrated ammonium hydroxide. The product thus obtained had 45.6 percent solids.

A quantity of the above latex equivalent to 100 parts of dry solids was blended with 1.6 parts (dry basis) of Super-Amide B–5, a brand of coconut fatty acid diethanolamine condensate, 5 parts (dry basis) of water-soluble melamine formaldehyde resin and sufficient water to give 42 percent total solids, then the mixture was mechanically foamed in a planetary mixer. An aqueous dispersion of 3 parts of sodium silico-fluoride was next blended with the foam in the same mixer and the resulting foamed material was poured into a closed mold which was subsequently placed in an oven at 190° F. for 10 minutes to gel the frothed structure. The gelled foam was then placed in a forced-air oven at 250° F. for 30 minutes to drive off water and complete the cure. The rubber foam obtained thereby was white and non-tacky and had a density of 8 pounds per cubic foot; the glass ball rebounded 3½ inches in the rebound test described hereinafter.

While not required in the practice of this invention, in the foregoing example the sodium silico-fluoride was added (1) because it is conventionally used in the latex foam art, (2) to demonstrate that its presence is not deleterious when used with this invention, and (3) so that a direct comparison can be made with the hereinafter described experiment carried out in the absence of just one of the critical features of this invention (a reactive substituent group on the latex polymer).

For purposes of contrast with the foregoing product and advantageous results of the present invention, another latex was prepared in an identical manner except 10 parts of styrene was substituted for the 10 parts of acrylic acid. To the resulting styrene-butadiene latex were added the other ingredients of the above example and the same procedure was used in an attempt to prepare a solid foam. The sodium silico-fluoride was included particularly to give the experiment the advantage of the known prior art. Nevertheless, during the heat gelling step carried out as described in the above example, the foam structure collapsed and thus a solid foam could not be produced.

*Example 2*

A synthetic latex was prepared by the method of U.S. Letters Patent 2,914,499 from a monomer composition of 74.6 parts of vinyl chloride, 24.9 parts of vinylidene chloride and 0.5 part of 2-sulfoethyl methacrylate. To 100 parts of this latex, calculated on a dry solids basis, was added 2 parts of nonyl phenol-ethylene oxide condensate having 9-10 moles of ethylene oxide per mole of nonyl phenol and a cloud point of 52-56° C., then the pH of the mixture was adjusted to 3.0 by addition of glacial acetic acid. To that mixture were added 20 parts of a dioctyl phthalate emulsion, calculated on a dry basis, 6 parts of melamineformaldehyde resin and 0.5 part of an alkanol amine hydrochloride catalyst sold commercially by the Monsanto Chemical Company under the brand name Catalyst A-C. The mixture was mechanically foamed in a planetary mixer, sealed in a mold preheated to 175° F., and heated in an oven at 200° F. for 10 minutes. The product, in the form of a gelled foam, was removed from the mold; then the foam was dried and cured at a temperature of about 250° F. for about 30 minutes. The product obtained thereby was soft and flexible and had a good cell structure.

*Example 3*

To 158 parts of a latex having a pH of 4.6 and comprising 75 parts of a copolymer of styrene and 1,3-butadiene in the weight ratio of about 2:3 with sufficient monoethylenically unsaturated carboxylic acid to provide about 1.7 weight percent, based on the total weight of the polymer, of carboxyl groups was added 0.75 part (as 15 parts of a 5 percent aqueous solution) of 15 c.p.s. methyl cellulose, 3.75 parts (as 4.7 parts of an 80 percent methanol solution) of a water-soluble melamine formaldehyde resin. The mixture, which contained a total of about 2 parts sodium lauryl sulfate, was whipped in a planetary mixer for 3 to 4 minutes to give a good froth. The wet froth was poured into a mold and placed in a saturated steam atmosphere at atmospheric pressure and at 180-190° F. for 5 minutes to give a definite, firm gel without significant collapse of cells. The gelled foam was then dried in a forced air oven at 250° F. for 30 minutes to drive off water and complete the cure. The dry foam product was white, non-tacky and had the appearance and feel typical of a latex foam made by conventional processes using natural rubber latex. The density of the foam was 7.65 pounds per cubic foot; the glass ball rebounded 4½ inches in the rebound test; the compression modulus was 2.3 pounds per square inch; and the compression set was less than 1 percent (tests described hereinafter).

*Example 4*

To 100 parts of latex having a pH of 2 and comprising 50 parts of a copolymer of styrene and 1,3-butadiene in the weight ratio of about 5:4 with sufficient monoethylenically unsaturated carboxylic acid to provide about 3.0 weight percent, based on the total weight of the polymer, of carboxyl groups was added sufficient ammonium hydroxide to raise the pH to 3.8, then about 2.5 parts (as 3.1 parts of an 80 percent methanol solution) of water-soluble, melamine-formaldehyde resin and about 0.09 part (as 1.7 parts of a 5 percent aqueous solution) of 15 cps. methyl cellulose; the mixture was whipped in a planetary mixer for 3 to 4 minutes until a good froth was obtained; the wet forth was poured into a mold and placed in a saturated steam atmosphere at 190° F. and at atmospheric pressure for ten minutes to give a definite, firm gel without significant collapse of cell structure; the gelled foam was then dried in a forced-air oven at 250° F. for 30 minutes to drive off water and complete the cure. The foam product obtained thereby was white, flexible and non-tacky. The foam density was 7.4 pounds per cubic foot; the glass ball rebounded 1½ inches in the rebound test; the compression modulus was 3.7 p.s.i.; and the compression set was 5.0 percent (tests described hereinafter).

For the monoethylenically unsaturated carboxylic acid in Examples 3 and 4, there are used acrylic acid, fumaric acid, maleic acid, itaconic acid, methacrylic acid, mixtures thereof, and the like, with substantially the same results.

*Example 5*

(A) A latex comprising a copolymer of 40 percent of styrene, 58 percent of 1,3-butadiene, 1.75 percent of acrylic acid and 0.25 percent of fumaric acid, based on the total weight of the copolymer was adjusted to a pH of 13 with ammonium hydroxide, then there was added to separate portions 5 parts of one of the gelling agents listed in items 1 and 2 of Table I per 100 parts of copolymer in the latex. The change in pH of the latex was followed with a pH meter while the pH value was slowly reduced as ammonia volatilized. The pH at which gelation occurred is shown in Table I. With the same gelling agents, and in experiments in which the pH of the latex was adjusted to a value of 13 with potassium hydroxide, then sodium silicofluoride, potassium silicofluoride, or nitropropane were added as pH depressing agents, gelation occurred at substantially the same pH as already shown.

(B) Ammonium hydroxide was added to other portions of the same latex to adjust the pH to 8.5 to 9.0, then 5 parts of one of the gelling agents listed in items No. 3 to 9 and 2.5 parts of sodium silicofluoride per 100 parts of the copolymer in the latex were added. The pH change of each such formulation was followed with a pH meter and the pH at which gel formation occurred was recorded. The data are shown in Table I.

(C) To another portion of the same latex, with the pH adjusted in the same manner, was added 5 parts of urea per 100 parts of the copolymer in the latex; then dilute acetic acid was added dropwise while the pH change was followed with a pH meter; it was found that gel formation occurred at a pH of 4.8 (item 10, Table I).

(D) Other gelling agents, shown as items 11 to 17 in Table I, were added to other portions of the same latex in the same manner as Example 5(B) except that the samples were heated at 200° F. for from 2 to 5 minutes after all the additives were present. The pH at which gelation occurred is shown in Table I.

Sodium silicofluoride was used in some of these tests to provide a convenient means for slowly and continuously reducing the pH. However, that sodium silicofluoride is not essential is shown by the results of Examples 5 (A) and 5(C); in addition, random rechecking of the gelling agents shown in (B) and (D) by adjusting the pH to the same value as shown in Table I, using dilute acetic or ammonium hydroxide as required, gave the same gelation behavior.

All of the materials listed in Table I as gelling agents are effective in the practice of the instant invention and are within the scope of the "coreactive material" as contemplated and hereinbefore defined.

No gelation occurred when the pH values of other portions of the same latex were continuously varied in the pH range of 3 to 13, with or without sodium silicofluoride, but in the absence of any of the coreactive materials as defined.

TABLE I

| Item No. | Gelling Agent | Gelling pH |
|---|---|---|
| 1 | Kymene 709 polyamide resin | 12.5 |
| 2 | Polyethyleneimine | 10.9 |
| 3 | Versamid 125 polyamide resin | 8.5 |
| 4 | Triethylenetetramine | 6.6 |
| 5 | Cymel 405 melamine-formaldehyde resin | 6.6 |
| 6 | Diphenyl guanidine | 6.5 |
| 7 | Melamine | 6.5 |
| 8 | Aerotex M-3 melamine-formaldehyde resin | 6.0 |
| 9 | Urac 110 urea-formaldehyde resin | 5.8 |
| 10 | Urea | 4.8 |
| 11 | An emulsion of a low molecular weight liquid resin based on Bisphenol A and epichlorohydrin | 5.8 |
| 12 | Propylene carbonate | 6.3 |
| 13 | Aldocryl X-12 acrolein polymer | 5.8 |
| 14 | 3,4-epoxy-6-methylcyclohexylmethyl-3,4-epoxy-6-methylcyclohexane carboxylate | 5.8 |
| 15 | Vinylcyclohexene dioxide | 5.8 |
| 16 | Hexamethoxy methylol melamine | 5.8 |
| 17 | Epoxidized soybean oil | 5.8 |

Kymene 709 polyamide resin is a cationic polyamide resin in the form of a solution at 25±1% solids concentration, having a pH of from 2.5–3.0, and a viscosity of 65–85 centipoises at 25° C. The resin contains 12.8 percent nitrogen.

Versamid 125 polyamide resin is a cationic linear polyamide derived from the condensation of a dimeric fatty acid with a polyamine by the method of U.S. Patent 2,379,413. Other characteristics of Versamid 125 are:

| | |
|---|---|
| Amine value * | 290–320 |
| Brookfield viscosity at 25° C. | 450–550 |
| Specific gravity (25° C./25° C.) | 0.97 |
| Density at 25° C., lb. per gallon | 8.1 |

* Milligrams of KOH equivalent to base content of one gram of polyamide as determined by HCl titration.

Cymel 405 melamine-formaldehyde resin is a low reacted type of heat setting melamine formaldehyde resin in the form of a free-flowing, dry, white powder which is soluble in water in concentrations from about 30 percent to about 65 percent at 30° C. Some properties of a typical 50 percent solution in water are as follows:

| | |
|---|---|
| Viscosity @ 20° C., Stormer, centipoises | 30 |
| pH, glass electrode, at 25° C. | 9.3 |
| Solution density, g./cm.$^3$ | 1.20 |

Aerotex M-3 melamine formaldehyde resin is a partially methylated melamine formaldehyde condensate in the physical form of a clear, viscous syrup at a concentration of 80 percent by weight of active ingredients; the syrup having a density of 10 pounds per gallon, a pH of 8.5–9 and being soluble in water in all proportions.

Urac resin 110 is a white, unmodified urea-formaldehyde resin containing no filler or inert material.

Bisphenol A is p,p'-isopropylidenediphenol. It is also known as 2,2-bis(4-hydroxyphenyl)propane.

Aldocryl X-12 is a low molecular weight acrolein condensate which is miscible with water in all proportions and is available as a pale yellow aqueous solution at a concentration of 50 percent by weight. Average properties are:

| | |
|---|---|
| Molecular weight | 180–200 |
| Viscosity at 20° C. | 6.65 |
| Density at 20° C., g./ml. | 1.135 |
| Flash point, TOC, ° F. | 190 |
| pH | 4–5 |

Examples 1 through 4 illustrate that good latex foam products are obtained without the vulcanizing agents and accessory vulcanizing ingredients of the prior art. Additionally, Examples 2 through 4 were prepared without the coagulating or destabilizing agents of the prior art, e.g., sodium silicofluoride, ammonium acetate, alkali fluotitanates, alkali fluozirconates, carbon dioxide, nitropropane and the like. However, as shown in Example 1, such gelling agents may be used together with the practice of this invention if desired. Example 2 similarly shows that a plasticizer and a curing catalyst can be used also. In all these examples latex foam products with good properties were obtained.

Example 5, in addition to showing other coreactive materials which find utility in the practice of this invention, also indicates how other materials, within the scope contemplated by this invention, may be tested to find the optimum pH to which the blend with a water dispersion of a particular reactive polymer should be adjusted.

In other experiments solid latex foam products with a density as low as 2.5 pounds per cubic foot have been prepared by the method of this invention.

The tests used in these examples are described as follows:

*Rebound test.*—A glass ball, ¾ inch in diameter and weighing 11.3 grams, is dropped from a height of 15 inches onto a piece of foam about 1 inch in thickness. The height of rebound is measured in inches. The test is carried out at 75° F. after the materials and equipment have been conditioned at that temperature.

*Compression set.*—The compression set was measured by a method similar to ASTM D395–55. In the modified test the material is compressed to 50 percent of its original thickness ($t_0$) and held for 22 hours at 212° F. The load is then released and the material is allowed to cool for 30 minutes, then the final thickness ($t_1$) is measured. The percentage compression set is $$\frac{t_0 - t_1}{t_0} \times 100$$

*Compression modulus.*—A sample of foam, whose dimensions are 2 inches by 2 inches by 1 inch thick, is compressed to 25 percent deflection (i.e., to ¾ inch thickness) on an Instron tensile testing machine using a crosshead speed of 10 inches per minute. The compression modulus in pounds per square inch is $$\frac{\text{Total compressive force (lbs.)}}{4 \text{ (square inches)}}$$

While not required for the practice of this invention, conventional vulcanizing agents, accelerators, ultra accelerators, zinc oxide, antioxidants, gelling agents, and the like as well as other known rubber compounding ingredients, such as plasticizers, mineral fillers, and carbon black, may be included as part of composition if desired.

The invention has been illustrated by only a few of the many variations that are possible within the scope contemplated by the foregoing description and as defined by the appended claims. With any of the reactive latexes, selections can be made from the coreactive materials herein described which, when employed within the ratios prescribed and used in the process of this invention, provide latex foam products with desirable properties.

Latex foam rubber made by the process of this invention finds usefulness in the many applications where foam rubber is desirable, e.g., pillows, mattresses, furniture cushioning, rug backing, brassieres. Solid non-rubbery foam products find usefulness in areas where elastomeric properties are not required such as in insulating materials.

That which is claimed is:

1. A process for preparing a solid foam comprising the steps of (1) mixing a latex comprising a copolymer of at least two polymerizable, ethylenically unsaturated monomers selected from the class consisting of styrene and monomers copolymerizable with styrene wherein from about 0.5 to about 20 percent by weight of the said monomers consists of at least one such monomer which has a pendant reactive substituent group, such monomer being selected from the group consisting of monoethylenically unsaturated monocarboxylic and dicarboxylic acids, a 2-sulfoalkyl acrylate, an acrylamide, an N-hydroxyalkyl acrylamide, a primary aminoalkyl acrylate, a secondary aminoalkyl acrylate, an acrylic aldehyde, a primary hydroxyalkyl acrylate, a secondary hydroxyalkyl acrylate, vinylbenzyl amine, vinylbenzyl alcohol, allyl alcohol, styrene sulfonamide, hydroxystyrene, sodium styrene sulfonate, sodium alpha-methylstyrene sulfonate, and glycidyl methacrylate with from about 1 to about 100 percent, based on the weight of the copolymer in the latex, of at least one coreactive material in water-dilutable condition and having at least two reactive groups, said coreactive material being selected from the group consisting of ammonia-formaldehyde condensates, amine-formaldehyde condensates, phenol-formaldehyde condensates, primary and secondary amines having at least two amino groups per molecule, liquid epoxies having at least two epoxy groups per molecule, urea, urea-formaldehyde condensates, and saturated aliphatic dicarboxylic acids; said coreactive material being selected such that the reactive groups on the coreactive material are different from and coreactive with the reactive groups on the monomer component of the copolymer comprising the latex; (2) foaming the resulting mixture, (3) gelling the resulting foam and (4) curing and drying the gelled foam.

2. The process of claim 1 in which the latex comprises a copolymer of styrene, 1,3-butadiene and acrylic acid.

3. The process of claim 1 in which the latex comprises a copolymer of styrene, 1,3-butadiene and fumaric acid.

4. The process of claim 1 in which the latex comprises a copolymer of styrene, 1,3-butadiene, fumaric acid and acrylic acid.

5. The process of claim 1 in which the latex comprises a copolymer of vinylidene chloride, vinyl chloride, and 2-sulfoethyl methacrylate.

6. The process of claim 1 in which the coreactive material is melamine-formaldehyde resin.

7. The process of claim 1 in which the coreactive material is urea-formaldehyde resin.

8. The process of claim 1 in which the coreactive material is urea.

9. The process of claim 1 in which the coreactive material is melamine.

10. A solid foam prepared from a blend of (1) a latex comprising a copolymer of at least two polymerizable, ethylenically unsaturated monomers selected from the class consisting of styrene and monomers copolymerizable with styrene wherein from about 0.5 to about 20 percent by weight of the said monomers consists of at least one such monomer which has a pendant reactive substituent group, such monomer being selected from the group consisting of monoethylenically unsaturated monocarboxylic and dicarboxylic acids, a 2-sulfoalkyl acrylate, an acrylamide, an N-hydroxyalkyl acrylamide, a primary aminoalkyl acrylate, a secondary aminoalkyl acrylate, an acrylic aldehyde, a primary hydroxyalkyl acrylate, a secondary hydroxyalkyl acrylate, vinylbenzyl amine, vinylbenzyl alcohol, allyl alcohol, styrene sulfonamide, hydroxystyrene, sodium styrene sulfonate, sodium alpha-methylstyrene sulfonate, and glycidyl methacrylate and (2) from about 1 to about 100 percent, based on the weight of the copolymer in the latex, of at least one coreactive material in water-dilutable condition and having at least two reactive groups, said coreactive material being selected from the group consisting of ammonia-formaldehyde condensates, amine - formaldehyde condensates, phenol-formaldehyde condensates, primary and secondary amines having at least two amino groups per molecule, liquid epoxies having at least two epoxy groups per molecule, urea, urea-formaldehyde condensates, and saturated aliphatic dicarboxylic acids, said coreactive material being selected such that the reactive groups on the coreactive material are different from and coreactive with the reactive groups on the monomer component of the copolymer comprising the latex.

11. The solid foam of claim 10 in which the latex comprises a copolymer of styrene, 1,3-butadiene and acrylic acid.

12. The solid foam of claim 10 in which the latex comprises a copolymer of styrene, 1,3-butadiene and fumaric acid.

13. The solid foam of claim 10 in which the latex comprises a copolymer of styrene, 1,3-butadiene, fumaric acid and acrylic acid.

14. The solid foam of claim 10 in which the latex comprises a copolymer of vinylidene chloride, vinyl chloride and 2-sulfoethyl methacrylate.

15. The solid foam of claim 10 in which the coreactive material is a melamine-formaldehyde condensate.

16. The solid foam of claim 10 in which the coreactive material is an urea-formaldehyde condensate.

17. A composite article composed of a substrate with an adherent coating of a solid foam prepared from a blend of (1) a latex comprising a copolymer of at least two polymerizable, ethylenically unsaturated monomers selected from the class consisting of styrene and monomers copolymerizable with styrene wherein from about 0.5 to about 20 percent by weight of the said monomers consists of at least one such monomer which has a pendant reactive substituent group, such monomer being selected from the group consisting of monoethylenically unsaturated monocarboxylic and dicarboxylic acids, a 2-sulfoalkyl acrylate, an acrylamide, an N-hydroxyalkyl acrylamide, a primary aminoalkyl acrylate, a secondary aminoalkyl acrylate, an acrylic aldehyde, a primary hydroxyalkyl acrylate, a secondary hydroxyalkyl acrylate, vinylbenzyl amine, vinylbenzyl alcohol, allyl alcohol, styrene sulfonamide, hydroxystyrene, sodium styrene sulfonate, sodium alpha-methylstyrene sulfonate, and glycidyl methacrylate and (2) from about 1 to about 100 percent, based on the weight of the copolymer in the latex, of at least one coreactive material in water-dilutable condition and having at least two reactive groups, said coreactive material being selected from the group consisting of ammonia-formaldehyde condensates, amine-formaldehyde condensates, phenol-formaldehyde condensates, primary and secondary amines having at least two amino groups per molecule, liquid epoxies having at least two epoxy groups per molecule, urea, urea-formaldehyde condensates, and saturated aliphatic dicarboxylic acids; said coreactive material being selected such that the reactive groups on the coreactive material are different from and coreactive with the reactive groups on the monomer component of the copolymer comprising the latex.

18. A process for preparing a solid foam comprising the steps of
(1) mixing (a) a latex consisting essentially of a copolymer comprising styrene, butadiene and a copolymerizable monoethylenically unsaturated carboxylic acid with (b) a melamine-formaldehyde resin
(2) foaming the resulting mixture
(3) gelling the resulting foam
(4) curing and drying the resulting foam in the absence of vulcanizing agents.

19. A process for preparing a solid foam comprising the steps of
(1) mixing (a) a latex consisting essentially of a copolymer comprising styrene, butadiene and acrylic acid with (b) a melamine formaldehyde resin
(2) foaming the resulting mixture
(3) gelling the resulting foam by the addition of pH adjusting agents but in the absence of other gelling agents
(4) curing and drying the resulting gelled foam in the absence of vulcanizing agents.

20. The process of claim 1 which is carried out in the absence of vulcanizing agents.

21. The solid foam of claim 10 which is free from a vulcanizing agent.

22. The composite article of claim 17 in which the adherent coating is free from a vulcanizing agent.

23. The process of claim 20 in which the gelling step is carried out by temperature control and by the addition of pH adjusting agents but in the absence of other gelling agents.

References Cited by the Examiner

UNITED STATES PATENTS

| | | | |
|---|---|---|---|
| 2,512,464 | 6/50 | Mann | 260—2.5 |
| 2,653,918 | 9/53 | Eckert | 260—2.5 |
| 2,772,194 | 11/56 | Fisher et al. | 161—161 |
| 2,776,330 | 1/57 | Jones et al. | 260—2.5 |
| 2,801,274 | 7/57 | Bethe | 260—2.5 |
| 2,856,316 | 10/58 | Van Gils | 260—2.5 |

FOREIGN PATENTS

| | | |
|---|---|---|
| 754,553 | 8/56 | Great Britain. |
| 863,265 | 3/61 | Great Britain. |

SAMUEL H. BLECH, *Primary Examiner.*

LEON J. BERCOVITZ, MURRAY TILLMAN,
*Examiners.*

UNITED STATES PATENT OFFICE
CERTIFICATE OF CORRECTION

Patent No. 3,215,647                              November 2, 1965

Edwin R. Dunn

It is hereby certified that error appears in the above numbered patent requiring correction and that the said Letters Patent should read as corrected below.

Column 1, line 28, for "cogulating" read -- coagulating --; column 6, line 33, after "30" insert -- parts --; column 8, line 64, after "acetic" insert -- acid --.

Signed and sealed this 26th day of July 1966.

(SEAL)
Attest:

ERNEST W. SWIDER                           EDWARD J. BRENNER
Attesting Officer                              Commissioner of Patents